Patented Sept. 12, 1950

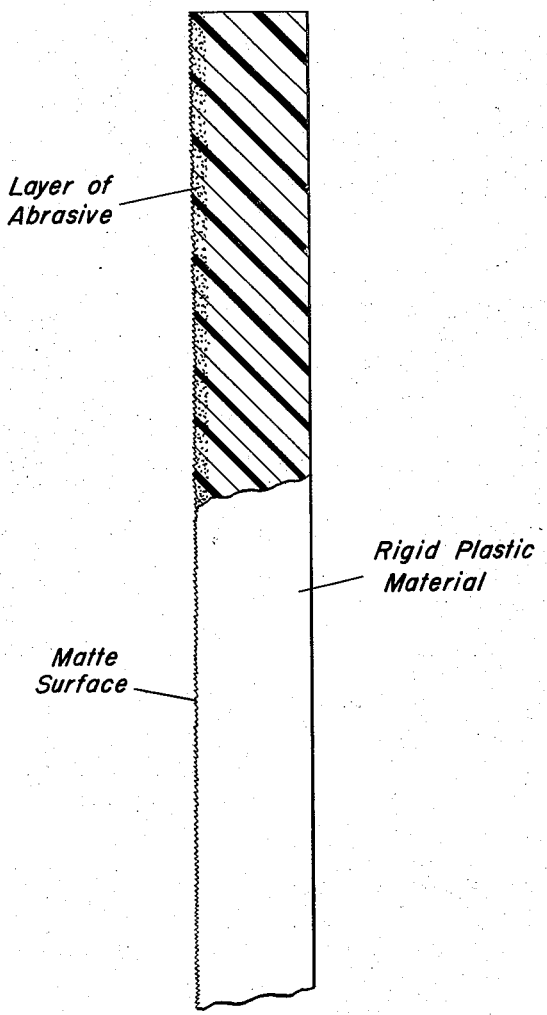

2,522,351

UNITED STATES PATENT OFFICE 2,522,351

PLASTIC CHALKBOARD

Charles B. Egolf, Philadelphia, Pa., assignor to Rohm & Haas Company, Philadelphia, Pa., a corporation of Delaware Application August 15, 1949, Serial No. 110,478

4 Claims. (Cl. 235—68)

This invention relates to an abrasion-resistant plastic chalkboard and particularly to an acrylic resin chalkboard that has been made abrasion-resistant by the incorporation of hard abrasive materials in the writing surface.

It is known that sheets of styrene or of acrylic resins, such as polymerized methyl methacrylate and copolymers of methyl methacrylate with other polymerizable materials, may be formed by polymerizing the monomeric materials under controlled conditions in cells formed by sheets of glass that are sealed about their outer edges with a flexible material. Such processes are described in U. S. Patents 2,154,639 and 2,328,525. In these processes, the surface of the glass sheet against which the polymer is formed is reproduced in the sheet of polymer with any design in reverse. By polymerizing the monomeric materials in a cell made from a sheet of glass having a matte surface a sheet of polymer is obtained which also possesses a matte surface. Such a surface on a plastic sheet forms a very satisfactory surface for writing with chalk but on repeated use the surface acquires a glare and becomes unsatisfactory.

It has now been found that the incorporation of particles of abrasive materials in or closely adjacent the matte surface of the plastic sheets not only greatly improves the wear-resistance of the matte surface but gives a product which improves with use. To accomplish this, particles of the abrasive are added to the monomeric material which may or may not contain dissolved polymer to increase the viscosity of the mixture. This mix is then charged to a cell formed of two sheets of glass held apart and sealed at their edges, one of the sheets having an inner matte surface. A suitable matte surface on the glass sheet may be obtained by sand-blasting or honing. During the filling of the cell, it should be in an almost horizontal position with the matte surface at the bottom. The filled mold is allowed to remain in a horizontal position until the particles of abrasive settle to form a layer adjacent the bottom of the matte surface of the polymeric sheet. The material in the cell is then brought to the fully polymerized state in the conventional manner.

Pigments or dyes may be added to the monomeric material to give a polymeric sheet having a color that contrasts with the color of the chalk to be used. A phthalocyanine blue or green shade is particularly pleasing.

The polymeric plastic material may be formed from any monomeric material which on polymerizing in sheet form results in rigid sheets. The acrylic plastics based upon methyl methacrylate are particularly satisfactory. The methyl methacrylate may be the sole polymerizable material or it may be polymerized in admixture with other polymerizable materials, particularly the methyl and ethyl esters of acrylic acid. Polystyrene plastics are also suitable, particularly the polystyrene plastics that are modified with acrylic derivatives such as methyl acrylate, ethyl acrylate and acrylonitrile or with linear polyesters of glycols and dibasic acids at least partially composed of maleic or fumaric acid. These plastic materials are all known in the art.

The abrasive material is preferably carborundum powder or silica. The size of the abrasive particles may vary from 5 to 150 microns. A diameter of less than 100 microns is preferred because premature settling during the mold-filling operation does not occur with particles of that size. Very small particles should be avoided as they require too long a settling time and do not give satisfactory results. The abrasive material should constitute 0.1% to 20% by weight of the mixture to be formed into a sheet.

The single figure of the attached drawing is an end view, partially in cross-section, of a chalkboard within the scope of the present invention. As will be noted therefrom, the chalkboard comprises a sheet of rigid polymeric plastic having a matte surface with particles of abrasive extending in a layer of substantial depth adjacent said matte surface.

The following example is given to illustrate the preparation of the plastic chalkboard:

A cell was prepared from two lights of

10" x 14" x ¼"

plate glass, one of which had a sand-blasted surface. These lights were held apart by small polymethyl methacrylate pyramids 0.3" high and the edges of the cell were formed of strips of gummed paper cemented around the perimeter of the sheets. The sand-blasted glass surface faced inward and an opening was left in the edge of the cell for filling. The cell was placed in a substantially horizontal position with the sand-blasted light on the bottom and the opening slightly raised.

A mixture of 600 grams of methyl methacrylate monomer containing 0.02% benzoyl peroxide, 0.3% stearic acid and 0.075% of a phthalocyanine pigment was heated with agitation to 80–100° C. until dissolved air was expelled and polymerization had advanced to the extent of 5% solids. It was then cooled and 12 grams of 200 mesh silica was added with stirring. The suspension of silica in partially polymerized material was then poured into the cell and the cell opening sealed with a patch of gummed paper.

A second mold was prepared and filled by the identical procedure except that the silica was omitted.

The two molds were placed in an oven in a horizontal position with the sand-blasted lights on the bottom and air at a temperature of 70° C. was circulated about them until polymerization was complete. The glass plates were then removed from the plastic sheets and the latter heat-treated at 80–100° C. to relieve any strains. This step is described in U. S. Patent 2,157,049.

In each case there resulted a plastic sheet having a matte surface well adapted for use as a chalkboard. To determine the permanence of the matte surfaces, each sheet was abraded for 1000 cycles by rubbing with a felt eraser and chalk dust and the percentage of light reflectance measured. The reflectance was measured photometrically by allowing light to strike the surface at an angle of 45° and the reflectance measured at an angle of 45°. The reflectance of a vitreous enameled standard was taken as 100%. The readings were 37% for the sample containing no silica and 9% for the sample containing the silica. This indicated the effect of the silica in preventing the development of glare.

Analysis of the sheet containing the silica showed that the abrasive had settled and was concentrated in the section adjacent the matte surface.

The same procedure can be followed in making plastic sheets suitable for use as chalkboards from the other polymerizable materials heretofore mentioned. The polymerization procedure may also be varied in ways well known in the art of making sheets from such polymerizable materials.

I claim:

1. A chalkboard comprising a sheet of rigid polymeric plastic having a matte surface and having dispersed in the plastic and concentrated adjacent the matte surface hard abrasive material of particle size from 5 to 150 microns, said abrasive material amounting to from about 0.1% to about 20% of the total weight of the sheet.

2. A chalkboard comprising a sheet of rigid polymeric plastic containing a preponderance of methyl methacrylate having a matte surface and having dispersed in the plastic and concentrated adjacent the matte surface hard abrasive material of particle size from 5 to 150 microns, said abrasive material amounting to from about 0.1% to about 20% of the total weight of the sheet.

3. A chalkboard comprising a sheet of rigid polymeric plastic containing a preponderance of methyl methacrylate having a matte surface and having dispersed in the plastic and concentrated adjacent the matte surface particles of silica of size from 5 to 150 microns, said silica amounting to from about 0.1% to about 20% of the total weight of the sheet.

4. A chalkboard comprising a sheet of polymethyl methacrylate having a matte surface and having dispersed and concentrated in the portion adjacent the matte surface particles of silica of size from 5 to 150 microns, said silica amounting to from about 0.1% to about 20% of the total weight of the sheet.

CHARLES B. EGOLF.

REFERENCES CITED

The following references are of record in the file of this patent:

UNITED STATES PATENTS

| Number | Name | Date |
|---|---|---|
| 253,864 | Hays et al. | Feb. 21, 1882 |
| 1,756,393 | Snell | Apr. 29, 1930 |
| 2,312,623 | Brooks et al. | Mar. 2, 1943 |